United States Patent
Kouznetsov et al.

(10) Patent No.: US 8,282,689 B2
(45) Date of Patent: Oct. 9, 2012

(54) COMPOSITION AND METHOD FOR ENHANCING THE PRODUCTION OF CRYSTAL AGGLOMERATES FROM A PRECIPITATION LIQUOR

(75) Inventors: Dmitri L. Kouznetsov, Aurora, IL (US); Jianjun Liu, Aurora, IL (US); Kim Richard Coleman, Naperville, IL (US); Ryan Travis Chester, Heathridge (AU); John David Kildea, Baldivis (AU)

(73) Assignee: Nalco Company, Naperville, IL (US)

( * ) Notice: Subject to any disclaimer, the term of this patent is extended or adjusted under 35 U.S.C. 154(b) by 618 days.

(21) Appl. No.: 12/495,914

(22) Filed: Jul. 1, 2009

(65) Prior Publication Data
US 2011/0002824 A1    Jan. 6, 2011

(51) Int. Cl.
*B01D 9/00*     (2006.01)
(52) U.S. Cl. ........................ 23/300; 23/313 R
(58) Field of Classification Search .................... 23/300, 23/313 R, 314, 313 AS, 313 P
See application file for complete search history.

(56) References Cited

U.S. PATENT DOCUMENTS

| | | |
|---|---|---|
| 3,642,437 A | 2/1972 | Angstadt et al. |
| 4,256,709 A | 3/1981 | Sizyakov et al. |
| 4,737,352 A | 4/1988 | Owen et al. |
| 5,106,599 A | 4/1992 | Roe |
| 5,312,603 A | 5/1994 | Hachgenei et al. |
| 6,168,767 B1 | 1/2001 | Welton et al. |
| 6,599,489 B2 | 7/2003 | Mahoney et al. |
| 2006/0292050 A1 | 12/2006 | Malito et al. |
| 2008/0159934 A1 | 7/2008 | Kouznetsov et al. |

FOREIGN PATENT DOCUMENTS

| | | |
|---|---|---|
| EP | 0 465 055 B1 | 4/1997 |
| RU | 2181695 C2 | 4/2002 |
| RU | 2184703 C2 | 7/2002 |
| RU | 2257347 C1 | 7/2005 |
| WO | WO 2008/076783 A2 | 6/2008 |

*Primary Examiner* — Edward Johnson
(74) *Attorney, Agent, or Firm* — Calfee, Halter & Griswold LLP

(57) ABSTRACT

The present invention relates ways to increase the output of a high quality product from the precipitation liquor crystallization process exemplified through the aluminum hydroxide recovery processes such as the Bayer process. The invention is a method of increasing the size of precipitated of a liquor. The invention in one embodiment relates to the use of a crystal growth modifier compositions added to the precipitation process to increase the particle size distribution of the precipitated alumina trihydrate.

6 Claims, No Drawings

COMPOSITION AND METHOD FOR ENHANCING THE PRODUCTION OF CRYSTAL AGGLOMERATES FROM A PRECIPITATION LIQUOR

FIELD OF THE INVENTION

The present invention relates to a composition that improved recovery of aluminum values from the aluminum hydroxide production process such as the Bayer process. In particular, the invention relates to the compositions and methods providing the increase of particle size of aluminum hydroxide product.

BACKGROUND OF THE INVENTION

Aluminum hydroxide is produced on an industrial scale by well-established methods such as the Bayer process. The precipitation process operators optimize their methods so as to produce the greatest possible yield from the aluminate process liquors while trying to achieve a particular crystal size distribution of aluminum hydroxide product. It is desirable in most instances to obtain the product of relatively large crystal size and to correspondingly limit the amount of very fine crystals since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, purge of carbon dioxide or flue gases, liquor loading, liquor purity, and the like.

Extensive efforts have been invested into finding chemical additives and methods limiting the factors negatively affecting particle size in order to achieve the optimal economic recovery of aluminum hydroxide product.

Despite the continuous and ongoing development worldwide, the industry demands for more economical resolution of the above-described process needs remain. A method of such resolution suitable for obtaining aluminum hydroxide crystals with increased particle size is provided by the present invention.

SUMMARY OF THE INVENTION

To satisfy the industry needs identified above, a method and compositions for obtaining aluminum hydroxide crystals with increased particle size have been developed.

According to the method of the present invention, the suitable compositions are blended and introduced into the process in an amount effective to obtain the changes desired. The compositions are introduced in their primary form without any further preparation.

The principal embodiment of the present invention is a crystal growth modifier composition represented by an emulsion having hydrocarbon oil content of more than 15%. The other key ingredient of such an emulsion is a surfactant, or a blend of surfactants, with the remaining ingredient being water.

DETAILED DESCRIPTION OF THE INVENTION

The following are definitions that apply to the relevant terms as used throughout this specification.

A: Stands for aluminum concentration expressed as g/L $Al_2O_3$

C: Stands for sodium hydroxide or caustic concentration expressed as g/L $Na_2CO_3$ S: Stands for total alkali concentration expressed as g/L $Na_2CO_3$ A/C: Refers to the alumina to caustic ratio CGM: This acronym stands for "crystal growth modifier."

Oil carrier: Describes a hydrophobic liquid that can be comprised of the aliphatic or aromatic compounds such as paraffinic oils, naphthenic oils, or fuel oils.

Also, bottoms or residual waste materials remaining from the production of aliphatic alcohols represent a suitable hydrophobic liquid.

The materials suitable as an oil carrier can be used neat or as a mixture of any proportion. The oil carrier needs only be a solvent for the surfactant or blend of surfactants and have a boiling point safely above the temperature of the hot aluminate liquor undergoing precipitation (about 80° C., 176° F.).

Weight percent ratio: The total weight fraction of one reagent within 100 grams of the composition or mixture.

Increase in Percent +45 µm fraction (−325 mesh): The response in all samples is the increase in the percent +45 µm fraction of the alumina trihydrate product (the size commonly monitored across the industry). The greater the increase, the better the CGM performance in producing the large size crystals.

Effective amount: An effective amount is deemed any dosage of any additive that affords an increase in the particle size distribution as measured by a change in the percent +45 µm fraction of the alumina trihydrate product.

Precipitation liquor. Refers to aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The Bayer process is one example of an alumina production process.

The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709 and 3,642,437 and RU. Pat. Nos. 2,184,703, 2,257,347, and 2,181,695, which are herein incorporated by reference.

As described in U.S. Pat. No. 4,737,352 assigned to Nalco, the invention in practice is unaffected by different proprietary precipitation techniques involving proprietary process parameters. This is of great significance because it establishes that regardless of the proprietary processing parameters maintained inside the precipitating tank, the present invention for actual practice only requires blending of the proposed treatment.

Precipitation feed liquor: refers to the precipitation liquor that flows into a precipitator of an aluminum hydroxide precipitation process.

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

The CGM emulsions of the present invention incorporate three basic ingredients:

A1: Surfactant or a blend of surfactants
A2: Oil carrier in the amount greater than 15%.
A3: Water.

Additional components may also be present in various concentrations however these three basic components constitute the key ingredients for such CGM emulsions.

The preferred surfactant in Ingredient A1 is tall oil fatty acid, but there are a host of equivalents. Thus, the surfactant may be a fatty acid having at least a saturated or unsaturated four carbon alkyl backbone, with or without one or more carboxylic acid, ester, anhydride or sulfate surfactant functional groups attached directly or by a succinic alkyl linkage. Advantageously the fatty acid may contain at least an eight-carbon backbone with at least one of the above functional groups attached.

Ingredient A1 may include C8-C35 unsaturated or saturated fatty acids with a straight or branched carbon chain or their blends.

Among the unsaturated acids preferable are palmitoleic, oleic, linoleic, linolenic, ricinoleic, eleostearic, docosahexaenoic acids, elcosapentaenoic acid, and the likes. Any combination of the unsaturated monobasic acids listed above may be used. Among the saturated fatty acids the acids with a straight chain are preferred, such as octadecanoic (stearic) acid, hexadecanoic (palmitic) acid, octadecanedioic acid and hexadecandioic acid, their blend, or blends with other saturated (and/or unsaturated) fatty acids with the hydrocarbon chains of 8-35 carbon atoms. In the formulations, the fatty acids can also be used as their esters with C1-C4 alcohols, including but not limited to methyl ester or ethyl esters.

Additionally, natural esters of the fatty acids can be utilized as Ingredient A1, which include crude or processed triglyceride oils of vegetable or animal origin such as soybean oil, linseed oil, castor oil, dehydrated castor oil, corn oil, safflower oil, sunflower oil, canola oil, fish oils, lard oil, beef oil, oiticica oil, tung oil, and tall oil, or their combinations. The suitable processed oils can be those processed by means of refining, heat polymerization, isomerization-conjugation, boiling, blowing, epoxidation, dehydration, copolymerization with ethylenic monomers selected from but not limited to the group of acrylate, methacrylate, styrene, acrylamide, acrylonitrile, vinyl carboxylate esters and vinyl halides, mixtures thereof, and salts thereof. In an exemplary embodiment, the suitable oils may be the crude and refined oils available, for example, from Archer Daniels Midland Company, Decatur, Ill., USA; blown, and boiled plant oils available, for example, from Cargill Inc., MN, USA; epoxidized oils available, for example, under the trade name Vikoflex® from ATOFINA Chemicals, Inc., PA, USA; dehydrated castor oil available, for example, under the trade name Castung from G. R. O'Shea Company, IL, USA; acrylated soybean oil available, for example, from Sartomer Company, PA, USA.

The fatty acid amides of Ingredient A1 are preferably represented by the condensation products of fatty acids with alkyl polyamines. The suitable alkyl polyamines can be exemplified by but are not limited to ethylene diamine, diethylene triamine, and triethylene tetramine.

Ingredient A1 may also comprise other ionic and nonionic surfactants or mixtures of thereof. The ionic surfactants may include anionic, zwitterionic, and cationic surfactants.

In an exemplary embodiment one may assist the formation of instant emulsions by "salting out" the hydrolysable surfactants of Ingredient A1 using a base, such as ammonia, amine, or alkali, whereby increasing the pH of the emulsion formulation to higher than 7.

A co-solvent may be added to the present emulsions to increase their stability. The suitable co-solvents can be selected from the group that includes but is not limited to polyoxyalkylene homopolymers and copolymers, straight chain or branched mono and polyhydric aliphatic or aromatic alcohols, and their monomeric, oligomeric, or polymeric alkoxylates.

In the principal embodiment of the present invention, the instant CGM compositions are prepared as water-in-oil or oil-in-water emulsions.

For a successful application, CGM composition must be homogeneously distributed in the precipitation environment to ensure its unimpeded contact with the fine particulate. Traditional waterless CGM formulations are prepared as solutions of functional ingredients in an oil carrier. The oil carrier is essential for helping distribute the CGM product in the green liquor or seed slurry stream. Still, to homogeneously blend an oil formulation into water based precipitation liquor significant mechanical energy is required. In this way, the emulsions of the present invention have a distinct advantage over the waterless formulations. The functional ingredients of these emulsions are already dispersed in water environment due to chemical forces. These chemical forces aid the mechanical forces to faster and more uniformly distribute the CGM product within the process stream. The availability of these chemical forces makes it also possible to reduce the amount of carrier oil present in CGM formulations without sacrificing performance. This in turn is beneficial for the plants concerned with the amount of external hydrocarbons added to their precipitation circuit.

Longer chain saturated fatty acids, such as stearic acid, are solid at room temperature and difficult to create liquid formulations with. The same applies to other suitable materials such as fatty amides that are not water or oil soluble, but when used in emulsion can be incorporated into a CGM product in a broad range of concentrations.

The instant CGM formulations prepared as microemulsions are preferred. Microemulsions are significantly different in structure from regular emulsions. Regular emulsions are comprised of separate oil droplets in water or water droplets in oil with a sharp transition between the two phases. Microemulsions have a particle size in the range from 10 to 600 nm, so that they appear as clear or opalescent one-phase formulations.

Unlike regular emulsions, microemulsions are thermodynamically stable. This means that microemulsions form spontaneously when the components are brought together and stay stable as long as the components are intact. Thus, their manufacturing may be reduced to simple kneading without the need for expensive high energy mixing. Also, microemulsions are not prone to separation or settling, which results in their long storage stability. Only gentle mixing is required to restore microemulsions upon their freezing or high temperature exposure.

The emulsions of the present invention are designed to incorporate more than 15% oil carrier. Earlier investigators, U.S. Pat. No. 06,168,767, found that CGM compositions can be prepared from blends of surfactants that may contain water but preferably contain substantially no water, while incorporating not more than 15% by weight of oil carrier. A thorough investigation of this contention is presented in the examples below. It reveals that the presence of more than 15% oil carrier is essential for a high performance of a CGM formulation.

The emulsified crystal growth modifier may be introduced into the precipitation liquor via various routes. In one embodiment, the emulsified crystal growth modifier is added to the precipitation liquor at the following steps of a Bayer process: a) to a precipitation feed liquor, b) to a seed slurry or other input stream to a precipitation tank, c) directly into a precipitation tank, and d) a combination thereof.

The emulsified crystal growth modifier can be added to the precipitation liquor via various modes of addition such as an in-line injection of the composition.

The amount of crystal growth modifier required to produce desirable effect depends upon the precipitation process parameters. Most often, this amount is determined by the surface area of available hydrated alumina solids in the precipitation liquor. The solids comprise the aluminum hydroxide introduced as seed or originated as new crystals or agglomerates during the decomposition of precipitation liquor The suitable amount of crystal growth modifier can range from about 0.01 to about 30 mg per square meter of the available aluminum hydroxide seed area, and preferably, from about 0.1 to about 15 mg per square meter. Commonly, less than about 8 mg per square meter of CGM can be used.

In case the available aluminum hydroxide area may not be reliably determined, the precipitation operators can dose the crystal growth modifier in relation to liquor flow by volume. In this case, the crystal growth modifier amount may range from about 0.01 to about 400 mg/liter of precipitation liquor, preferably from about 0.05 to about 200 mg/liter of precipitation liquor. Commonly less than about 100 mg/liter of CGM can be used.

The addition of the crystal growth modifier product to the precipitation liquor reduces the percent of alumina trihydrate crystal fines formed in the Bayer process substantially and thereby increases the yield of alumina trihydrate crystals of optimal particle size.

The examples below are offered to aid in understanding the present invention and are not to be construed as limiting the scope thereof.

EXAMPLES

The foregoing may be better understood by reference to the following examples, which are intended to illustrate methods for carrying out the invention and are not intended to limit the scope of the invention.

Precipitation Test Procedure: Each set of tests was run using either fresh pregnant liquor obtained from an alumina plant or using reconstituted pregnant liquor prepared by adding alumina trihydrate the plant spent liquor. Typical starting A/C ratio for liquors used in all tests was in the range 0.66-0.72 to 0.66-0.75.

All precipitation tests were performed in 250-mL Nalgene® bottles rotated end-over-end, at approximately 10-15 rpm, in an Intronics temperature-controlled water bath. Approximately 200 mL of liquor was accurately weighed into a series of bottles. The additive, where required was dosed to the appropriate bottles and all the bottles were then placed in the rotating bath for equilibration at the given test temperature (~20 minutes). After equilibration, the bottles were removed, quickly charged with the required quantity of seed and immediately returned to the water bath. The bottles were rotated for the given test duration.

On completion of the test, the bottles were removed from the bath and 10 mL of a sodium gluconate solution (400 g/L) was added to the remaining slurry and mixed well to prevent any further precipitation. The solids were collected by vacuum filtration and were thoroughly washed with hot deionized water and dried at 110° C. The particle size distribution was determined on a Malvern Particle Sizer using a method of laser diffraction that is well known in the art. The effect of CGM on the particle size distribution is inferred from the increase of the percent of particles sized greater than 45 μm in the precipitation product relatively to an undosed control sample.

Example 1

The tests used the precipitation procedure as described above. The liquor was fresh pregnant liquor with A/C=0.711. The CGM dose was 50 ppm. The charge of the standard seed was 75 g/L. The seed was DF225 alumina trihydrate obtained from R.J. Marshall Company, Southfield, Mich. The five-hour test was conducted at 75° C.

Table 1 lists the composition and performance of the instant microemulsions employing different amounts of oil carrier. The surfactant, oil and other components are the same for all formulations listed. The %+45 um fraction data listed is the average of triplicate samples.

TABLE 1

Effect of increasing oil content on the performance of CGM emulsion formulations.

| Treatment | Composition | | | | % +45 um |
| --- | --- | --- | --- | --- | --- |
|  | Surfactant | Oil | Water | Other components |  |
| Undosed Control |  |  |  |  | 60.2 |
| Emulsion A | 15 | 0 | 71 | 14 | 62.2 |
| Emulsion B | 15 | 15 | 56 | 14 | 65.2 |
| Emulsion C | 15 | 30 | 41 | 14 | 67.7 |
| Emulsion D | 15 | 45 | 26 | 14 | 67.3 |
| Emulsion E | 15 | 60 | 11 | 14 | 67.4 |

The results indicate that Emulsion A employing no oil carrier provides the lowest increase in %+45 um fraction relative to the undosed control sample and as a result is the least active CGM formulation. Surprisingly, the oil, despite having no activity in coarsening trihydrate precipitation when used alone, results in increased CGM activity when emulsion formulations contain increased concentrations of oil.

Example 2

This example demonstrates that maximizing the amount of oil component by eliminating the water content of the formulation (formulation 1) results in an effective CGM that increases the %+45 urn fraction relative to the undosed control sample. However, emulsion formulas containing significantly less oil but having the three vital components of surfactant, oil and water in appropriate proportions are found to be equally effective.

All emulsions in this example were prepared as clear microemulsions comprised of the same surfactant, oil and additional components. The waterless formulation 1 also used the same surfactant and oil as that used in the emulsions.

The tests used the precipitation procedure as previously outlined. The liquor was fresh pregnant liquor, A/C=0.707. The CGM dose was 50 ppm. The test was conducted using the same seed type and charge, holding time, and temperature as in Example 1. The %+45 um fraction data listed is the average of triplicate samples.

TABLE 2

Performance of Emulsions as compared to a waterless Formulation.

| Treatment | Composition | | | | % +45 um |
| --- | --- | --- | --- | --- | --- |
| | Surfactant | Oil | Water | Other components | |
| Undosed Control | | | | | 65.3 |
| Formulation 1 | 15 | 85 | 0 | 0 | 71.2 |
| Emulsion F | 15 | 20 | 41 | 24 | 71.5 |
| Emulsion G | 15 | 20 | 36 | 19 | 71.2 |

Example 3

A series of CGM emulsion compositions were tested under the same conditions as in the previous example using a different batch of fresh pregnant liquor, A/C=0.707. The test was conducted using the same seed type and charge, holding time, and temperature as in Example 1. The %+45 um fraction data listed in Table 3 is the average of triplicate samples.

Table 3 presents the compositions of the emulsions as compared to the waterless Formulation 2. The emulsions were prepared using a different surfactant to that used in the waterless Formulation 2. However, despite the lower oil content the emulsion formulas are shown to be equal to or more effective at coarsening the precipitated product, resulting in a greater increase in the %+45 um fraction compared to the undosed control sample.

TABLE 3

Performance of Emulsions as compared to a Waterless formulation.

| Treatment | Composition | | | | % +45 um |
| --- | --- | --- | --- | --- | --- |
| | Surfactant | Oil | Water | Other components | |
| Undosed Control | | | | | 67.0 |
| Formulation 2 | 15* | 85 | 0 | 0 | 74.2 |
| Emulsion L | 15 | 20 | 41 | 24 | 74.2 |
| Emulsion M | 15 | 20 | 36 | 19 | 76.2 |

*Surfactant in formulation 2 is different to that used in emulsions L and M.

Example 4

A series of CGM formulations were tested using the same general conditions as previously described. The test was conducted using fresh plant liquor and the same seed type as in earlier examples. Seed charge was 150 g/l, holding time was 4 hours and temperature was 80° C. The start liquor A/C=0.75 and the %+45 um fraction data listed in Table 4 is the average of triplicate samples for the control and duplicate samples for dosed treatments.

This example further demonstrates that an emulsion of this invention containing a blend of surfactants (to a total composition of 15%), water and oil can be produced and that such a formulation is more effective than a waterless formulation. Note that the waterless -formulations in this case are not exclusively surfactant/oil mixtures but also contain other non-water components. The results below indicate that Emulsion N containing 35% water, together with the surfactant and oil components provided much more effective coarsening than formulations 3 and 4.

TABLE 4

Performance of an emulsion product compared to Waterless formulations.

| Treatments | Composition (% w/w) | | | | % +45 um |
| --- | --- | --- | --- | --- | --- |
| | Surfactant | Oil | Water | Other components | |
| Undosed Control | | | | | 80.0 |
| Formulation 3 | 2 | 95 | 0 | 3 | 83.8 |
| Formulation 4 | 5 | 92 | 0 | 3 | 84.0 |
| Emulsion N | 15* | 17 | 35 | 33 | 86.0 |

*Surfactant blend

Example 5

CGM formulations were tested using the same general conditions as previously described. The test was conducted using the same seed type as in earlier examples. Seed charge was 75 g/l, holding time was 4 hours and temperature was 78° C. The %+45 um raction data listed in Table 5 is the average of triplicate samples all treatments.

This example again demonstrates that the performance of emulsions containing more than 15% oil, together with water and surfactant, are effective CGMs and perform equal to or better than a waterless Formulation 5.

All emulsions in this example were prepared as clear microemulsions

TABLE 5

Performance of emulsion products compared to a Waterless formulation.

| Treatments | Composition (% w/w) | | | | % +45 um |
| --- | --- | --- | --- | --- | --- |
| | Surfactant | Oil | Water | Other components | |
| Undosed Control | | | | | 63.5 |
| Formulation 5 | 10 | 90 | 0 | 0 | 69.0 |
| Emulsion P | 15 | 16 | 44 | 25 | 67.9 |
| Emulsion Q | 15 | 25 | 35 | 25 | 69.5 |
| Emulsion R | 15 | 25 | 37.5 | 22.5 | 69.7 |

What is claimed is:

1. A method for enhancing the production and recovering of crystal agglomerates from a precipitation liquor crystallization comprising the following:
    (i) adding to the precipitation liquor a crystal growth modifying composition comprised of one or a blend of surfactants, an oil in the amount greater than 15%, and water incorporated together as a emulsion;
    (ii) distributing the crystal growth modifying composition through the precipitation liquor; and
    (iii) precipitating crystal agglomerates from the liquor.

2. The method of claim 1 wherein the components are incorporated together in a microemulsion.

3. The method of claim 1, wherein an amount effective to increase the particle size of the precipitating crystal agglomerates of the crystal growth modifying composition is added to the precipitation liquor.

4. The method of claim 1 wherein the crystal growth modifying composition is used in the precipitation liquor crystallization of a Bayer process.

5. The method of claim 3, wherein the crystal growth modifying composition is added to the precipitation liquor in one or more of the following phases of the Bayer process:
   (i) to a precipitation feed liquor,
   (ii) to a seed slurry, and
   (iii) into a precipitation tank
   (iv) into an existing input stream of a precipitation tank 6. The method of claim 1, wherein the crystal growth modifying composition is distributed within the precipitation liquor by the means of conventional, high shear, or ultrasonic mixing.

* * * * *